UNITED STATES PATENT OFFICE 2,686,812

2,2',4-TRIHYDROXY-4'-ALKOXYBENZOPHE-NONES AND THE PROCESS OF PREPARING THE SAME

Robert W. Wynn and Paul E. Hoch, Easton, Pa., assignors to General Aniline & Film Corporation, New York, N. Y., a corporation of Delaware No Drawing. Application September 7, 1951, Serial No. 245,643

8 Claims. (Cl. 260—591)

This invention relates to 2,2',4-trihydroxy-4'-alkoxybenzophenones and to a process of preparing the same.

Various organic compounds exhibit the power to absorb light rays within the band of 2900 to 3700 Å, and when uniformly distributed through a transparent plastic sheet, the resultant sheet acts as a filter for all the light rays passing through and will transmit only those waves which are not absorbed by the sheet and/or the absorbing agent. Thus, it is possible to screen out undesirable light rays and utilize the resulting filter in many technical and commercial applications, such as wrapping tissues for food products and the like.

Many organic compounds, such as 2,4'-dihydroxybenzophenone, 2,5-dihydroxybenzophenone, 4,4'-dihydroxybenzophenone, 2,2'-dihydroxybenzophenone, and the like have been suggested as absorbents for ultraviolet light in various transparent plastic sheet materials and the stabilization of transparent plastics.

When 2,5-dihydroxybenzophenone is employed for the protection of polymeric vinylidene chloride products against darkening and embrittling effects of ultraviolet light, considerable discoloration of the product ensues. The 4,4'-isomer is completely ineffective when employed in the same products for the same purpose, and the 2,2'- and 2,4-isomers are only slightly effective as ultraviolet absorbers. The latter isomer is ineffective in filter coatings prepared from lacquers containing a cellulose ester, since the filter has a cut-off at about 290 m$\mu$. In other words, the isomer absorbs none of the ultraviolet light beyond 330 m$\mu$ and as a consequence, the filter containing it is practically transparent to all of the ultraviolet light which is normally present in sunlight at sea level.

2,2'-dihydroxybenzophenone is of limited value in certain types of transparent plastics. While it inhibits the physical breakdown of plastics and other materials in which it is incorporated, it is not satisfactory as a protective material against ultraviolet fading. In other words, this compound is not satisfactory as a protective material against ultraviolet light fading when employed in substantially colorless plastics, resins, film-forming materials, colored textiles, and the like. In some cases the colorless plastics and the like coated with said materials containing this compound become colored after several months. In other cases, slightly colored plastics or film forming material is itself discolored when exposed to ultraviolet light, and in still other cases, the plastic or film forming medium offers no protection to the colored object of its transmission of ultraviolet light.

We have discovered that 2,2',4-trihydroxy-4'-alkoxybenzophenones are not only compatible with various types of substantially colorless film forming plastics, resins, gums, waxes, and the like to yield ultraviolet absorbing compositions, but that their efficiency at 400 m$\mu$ is about twelve times that of any other compound currently used as an ultraviolet absorbent.

Accordingly, it is an object of the present invention to provide 2,2',4-trihydroxy-4'-alkoxybenzophenones and a process of preparing the same.

Other objects and advantages will appear hereinafter.

The compounds contemplated herein are characterized by the following general formula:

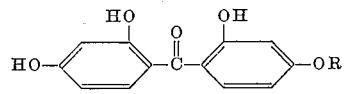

wherein R is alkyl, e. g., methyl, ethyl, propyl, isopropyl, butyl, isobutyl, amyl, isoamyl, hexyl, heptyl, octyl, octadecyl, lauryl, and the like.

The process involved in obtaining the foregoing compounds is carried out by first blowing 1⅓ moles of phosgene into 8 to 10 parts by volume, based on the weight of the phosgene, of a chlorinated hydrocarbon of the alkyl and benzene series, such as, for example:

| | |
|---|---|
| Ethylene chloride | Chlorobenzene |
| 1,1,1-trichloroethane | o-Chlorotoluene |
| 1,1,2-trichloroethane | m-Chlorotoluene |
| 1,3-dichloropropane | p-Chlorotoluene |

While the phosgene is being added, cooling is provided so that the temperature is maintained between 0°–10° C. One mole of anhydrous aluminum chloride is added and the solution warmed slowly to a temperature ranging between 30–35° C. At 35° C., 2 moles of resorcinol dialkyl ether are added dropwise during a period of time ranging from ¾ to 1 hour followed by the addition of 1 mole of aluminum chloride at a temperature not exceeding 38° C. The temperature is then slowly raised to about 75° C. and maintained at this temperature for about 2 to 3½ hours. The reaction mixture is then cooled and ice cold water containing 10% of concentrated hydrochloric acid is added. The mixture is then steam distilled to remove the chlorinated solvent and unreacted resorcinol dialkyl ether. The residue is cooled to room temperature and the aluminum chloride solution decanted on to a suction filter. The residue remaining in the reaction flask and the solid on the filter are washed with several portions of cold water. The solid on the filter is then added to the residue in the flask and treated with 2% sodium hydroxide solution, heated, and stirred until the solution is almost complete. It is then cooled and filtered and the ice cold basic solution is added to an ice cold 2 N hydrochloric acid solution. The precipitate is then filtered off, washed with water, and dried.

Alternatively the compounds may be prepared by alkylating 1 mole of the tetraalkali metal salt of 2,2',4,4'-tetrahydroxybenzophenone with 2 moles of an alkyl halide, such as bromide, chloride, or iodide, preferably in the presence of an acid binding agent, such as sodium or potassium carbonate or hydroxide, triethylamine, pyridine, alkali metal alkoxides, such as sodium methoxide, sodium ethoxide, potassium propoxide, and the like. The acid binding agent is preferably dissolved in a lower alcohol, such as methanol, ethanol, and the like.

The starting material, 2,2',4,4'-tetrahydroxybenzophenone is prepared according to the procedure of Shoesmith et al., outlined in J. Chem. Soc. 125, 113 (1924). The tetraalkali metal salt is prepared by treating 2,2',4,4'-tetrahydroxybenzophenone with an alkali metal alkoxide, such as sodium or potassium methoxide, ethoxide, and the like, in a lower alcohol. The alkylation or condensation reaction is selective and takes place readily at room temperature. The alkylating reagents, i. e., alkyl halides may be any one of the large group available such as, for example, methyl, ethyl, propyl, isoamyl, hexyl, heptyl, lauryl, chlorides, bromides, or iodides, including the dialkyl sulfates, such as dimethyl sulfate, diethyl sulfate, etc.

The following examples illustrate the preparation of the compounds of the foregoing formula, but it is to be clearly understood that they are not to be considered as being limitative.

*Example 1*

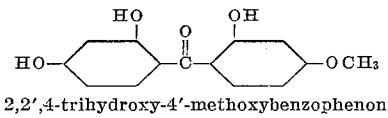

2,2',4-trihydroxy-4'-methoxybenzophenone 13 to 15 grams of phosgene are blown into a flask containing 150 cc. of dry ethylene dichloride with cooling down to about 5° C. 15 grams of anhydrous aluminum chloride are then added and the solution warmed slowly to 35° C. At this temperature 27.6 grams of resorcinol dimethyl ether are added dropwise during ¾ to 1 hour, followed by the addition of 15 grams of anhydrous aluminum chloride. During the latter reaction, the temperature is maintained at 35 to 38° C. The temperature is then slowly raised to 75° C. and maintained at this temperature for 2½ hours. The reaction mixture is then cooled and to it are added 100 cc. of ice cold water and 10 cc. of concentrated hydrochloric acid. The reaction mixture is then steam distilled to remove ethylene dichloride and resorcinol dimethyl ether. It is then cooled to room temperature and the aluminum chloride solution decanted on to a suction filter. The residue in the flask and the solid on the filter are washed with 2 small portions of cold water. The solid on the filter is added to the residue in the flask and to it are added 400 cc. of aqueous sodium hydroxide solution. The alkaline solution is then heated with stirring until dissolution of the solid is almost complete. It is then cooled and filtered. The filtered solution is then added to a well stirred solution of 100 cc. of ice cold 2 N hydrochloric acid and the solid which precipitates is filtered off, washed well with water, and dried. The yield of the crude product is 17 grams.

The crude product is dissolved in 35 cc. of hot 50% ethanol-water, the solution allowed to cool slowly to room temperature, and then permitted to stand overnight. It is then cooled in an ice water bath and filtered. The filter cake is washed with 15 cc. of ice cold 50% ethanol. The washed filter cake is sucked as dry as possible by means of an aspirator and then dissolved in 35 cc. of hot 100% methanol and the hot solution filtered. The filtrate is cooled in an ice water bath and filtered with suction. The filtrate is then concentrated on a steam bath to about 15 cc., cooled, and the final product filtered off. The melting point of the pure product is 131–135° C.

*Example II*

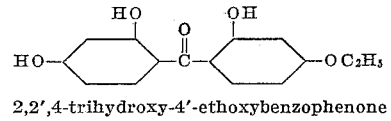

2,2',4-trihydroxy-4'-ethoxybenzophenone

Example I is repeated with the exception that 27.6 grams of resorcinol dimethyl ether are replaced by 33.2 grams of resorcinol diethyl ether. The product after recrystallization from hot 100% methanol is a yellow solid.

*Example III*

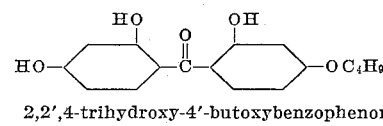

2,2',4-trihydroxy-4'-butoxybenzophenone

To a suspension of the tetra sodium salt of 2,2',4,4' - tetrahydroxybenzophenone prepared from 14.6 grams of tetrahydroxybenzophenone and 21.6 grams of sodium methoxide in ethyl alcohol were added 13.7 grams of butyl-bromide. The product obtained was a yellow solid.

The corresponding mono ethoxy, hexyloxy, octyloxy are also prepared in the same way.

While we have disclosed the preferred embodiments of our invention, it will be readily appreciated that many changes and variations may be made therein without departing from the spirit thereof. Accordingly, the scope of the invention is to be limited solely by the appended claims.

We claim:

1. 2,2',4-trihydroxy - 4' - alkoxybenzophenones characterized by the following general formula:

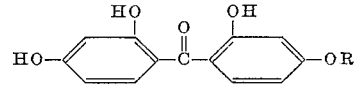

wherein R represents an alkyl group.

2. 2,2',4 - trihydroxy-4'-methoxybenzophenone having the following formula:

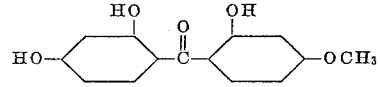

3. 2,2',4-trihydroxy - 4' - ethoxybenzophenone having the following formula:

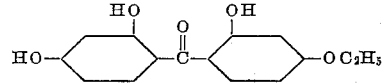

4. 2,2',4-trihydroxy - 4' - butoxybenzophenone having the following formula:

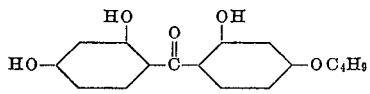

5. The process of preparing 2,2',4-trihydroxy-4'-alkoxybenzophenones which comprises condensing 2 moles of resorcinol dialkyl ether with 1⅓ moles of phosgene in the presence of 2 moles of aluminum chloride at a temperature of about 75° C. and hydrolyzing the resulting condensation product and isolating the 2,2',4-trihydroxy-4'-alkoxybenzophenone by filtration.

6. The process of preparing 2,2',4-trihydroxy-4'-methoxybenzophenone which comprises condensing 2 moles of resorcinol dimethyl ether with 1⅓ moles of phosgene in the presence of 2 moles of aluminum chloride at a temperature of about 75° C. and hydrolyzing the resulting condensation product and isolating the 2,2',4-trihydroxy-4'-methoxybenzophenone by filtration.

7. The process of preparing 2,2',4-trihydroxy-4'-ethoxybenzophenone which comprises condensing 2 moles of resorcinol diethyl ether with 1⅓ moles of phosgene in the presence of 2 moles of aluminum chloride at a temperature of about 75° C. and hydrolyzing the resulting condensation product and isolating the 2,2',4-trihydroxy-4'-ethoxybenzophenone by filtration.

8. The process of preparing 2,2',4-trihydroxy-4'-butoxybenzophenone which comprises condensing 2 moles of resorcinol dibutyl ether with 1⅓ moles of phosgene in the presence of 2 moles of aluminum chloride at a temperature of about 75° C. and hydrolyzing the resulting condensation product and isolating the 2,2',4-trihydroxy-4'-butoxybenzophenone by filtration.

References Cited in the file of this patent

Hoesch: "Berichte Deut. Chem. Gess.," vol. 50 (1917), page 465.

Staudinger et al.: "Helvet Chim. Acta," vol. 4, 1921, pp. 330–341.

Wilson et al.: "Ind. and Eng. Chem.," vol. 14 (1922), pp. 406–409.

Richter: "Organic Chemistry," vol. III, 3rd Eng. ed. (1946), pp. 520–521, Elsevier Publ. Co., New York, N. Y.

Beilstein: "Handbuch der Org. Chem.," 4th ed., vol. II, p. 542, supplement 2, page 509.